United States Patent [19]
VanDeMoere

[11] Patent Number: 5,285,228
[45] Date of Patent: Feb. 8, 1994

[54] PHOTOGRAPHIC FILM PACKAGE WITH ANTI-REFLECTION SUBSTANCE FOR VIEWFINDER

[75] Inventor: Alan V. VanDeMoere, Rochester, N.Y.

[73] Assignee: Eastman Kodak Company, Rochester, N.Y.

[21] Appl. No.: 4,870

[22] Filed: Jan. 19, 1993

[51] Int. Cl.⁵ .............................................. G03B 13/02
[52] U.S. Cl. .................................... 354/219; 354/288
[58] Field of Search ........ 354/199, 200, 201, 219–225, 354/288

[56] References Cited

U.S. PATENT DOCUMENTS 4,278,339  7/1981  Uchida et al. .................. 354/225 X
4,812,866  3/1989  Ushiro et al. ....................... 354/288

Primary Examiner—Michael L. Gellner
Assistant Examiner—Howard B. Blankenship
Attorney, Agent, or Firm—Roger A. Fields

[57] ABSTRACT

A photographic film package comprises a camera preloaded with a roll film and including a non-opaque body section having an integral front finder lens for viewing a subject to be photographed, and an outer opaque packaging tightly encasing the camera and having a front opening for the front finder lens. The outer packaging is coated with a light-absorbent substance at a location along its inside surface, which is sufficiently absorbent to prevent ambient light transmitted through the front finder lens to the location from being reflected off the inside surface at least to the front finder lens. Consequently, the peripheral edge of the front finder lens will not appear to have undesireable bright spots as in prior art cameras.

9 Claims, 2 Drawing Sheets

PHOTOGRAPHIC FILM PACKAGE WITH ANTI-REFLECTION SUBSTANCE FOR VIEWFINDER

BACKGROUND OF THE INVENTION

1. Field of the Invention

The invention relates generally to the field of photography, and in particular to a photographic film package more commonly known as a single-use or disposable camera.

2. Description of the Prior Art

Single-use or disposable cameras have become well known. Generally, each single-use camera is a point-and-shoot type that comprises a plastic inner camera shell or body and a paper-cardboard outer packaging that tightly encases the inner camera shell. The inner camera shell houses or supports the various camera components such as a fixed-focus taking lens, a film advance and metering mechanism, a shutter, a simple see-through viewfinder, a frame or exposure counter, a manual film advance thumbwheel, etc. The outer packaging has respective openings for the taking lens, the viewfinder, the frame counter, and the thumbwheel. At the manufacturer, the camera shell is loaded with a conventional 24-exposure 35 mm film cartridge, and substantially the entire length of the unexposed filmstrip is factory pre-wound from the cartridge into a supply chamber of the camera shell. After the photographer takes a picture, the thumbwheel is manually rotated to rewind the exposed frame into the cartridge. The rewinding movement of the filmstrip the equivalent of one frame rotates a metering sprocket to decrement the frame counter to its next lower numbered setting. When the filmstrip is fully exposed and completely rewound into the cartridge, the single-use camera is sent to a photofinisher who processes the filmstrip and recycles certain camera parts.

U.S. Pat. No. 4,812,866, issued Mar. 14, 1989, discloses a single-use camera comprising an opaque main body section pre-loaded with a roll film and including the shutter and the taking lens, an opaque back cover section attached to the rear of the main body section to light-tightly shield the film, and a transparent front cover section attached to the front of the main body section and having an integral single-element taking lens or an integral single-element finder lens and an integral viewfinder tunnel. A cardboard opaque box tightly encases the main body section and the front and rear cover sections, and has a front opening for the single-element taking or finder lens.

Problem to be Solved By the Invention

When in a single-use camera the front finder lens is integral with a transparent cover section of the camera body and the inside surface of the cardboard box is light-reflective ( for example because it is white or lightly colored), as in U.S. Pat. No. 4,812,866, ambient light transmitted through the front finder lens will be reflected off certain portions of the inside surface of the cardboard box which lie over the transparent front cover. Consequently, the peripheral edge of the front finder lens may appear to have undesireable bright spots that interfere with the view through the see-through viewfinder of a subject to be photographed.

SUMMARY OF THE INVENTION

According to the invention, a photographic film package comprising a camera pre-loaded with a roll film and including a non-opaque body section having an integral front finder lens for viewing a subject to be photographed, and an outer opaque packaging tightly encasing the camera and having a front opening for the front finder lens, is characterized in that:

the outer packaging is coated with a light-absorbent substance at a location along its inside surface, which is sufficiently absorbent to prevent ambient light transmitted through the front finder lens to the location from being reflected off the inside surface at least to the front finder lens.

Consequently, the peripheral edge of the front finder lens will not appear to have undesireable bright spots as in prior art cameras.

DETAILED DESCRIPTION OF THE PREFERRED EMBODIMENT

The invention is disclosed as being embodied in a 35 mm photographic film package more commonly known as a single-use or disposable camera. Because such a photographic camera has become generally known, this description is directed in particular to camera elements forming part of or cooperating directly with the invention. It is to be understood, however, that other elements not specifically shown or described may take various forms known to a person of ordinary skill in the art.

Figure 1:
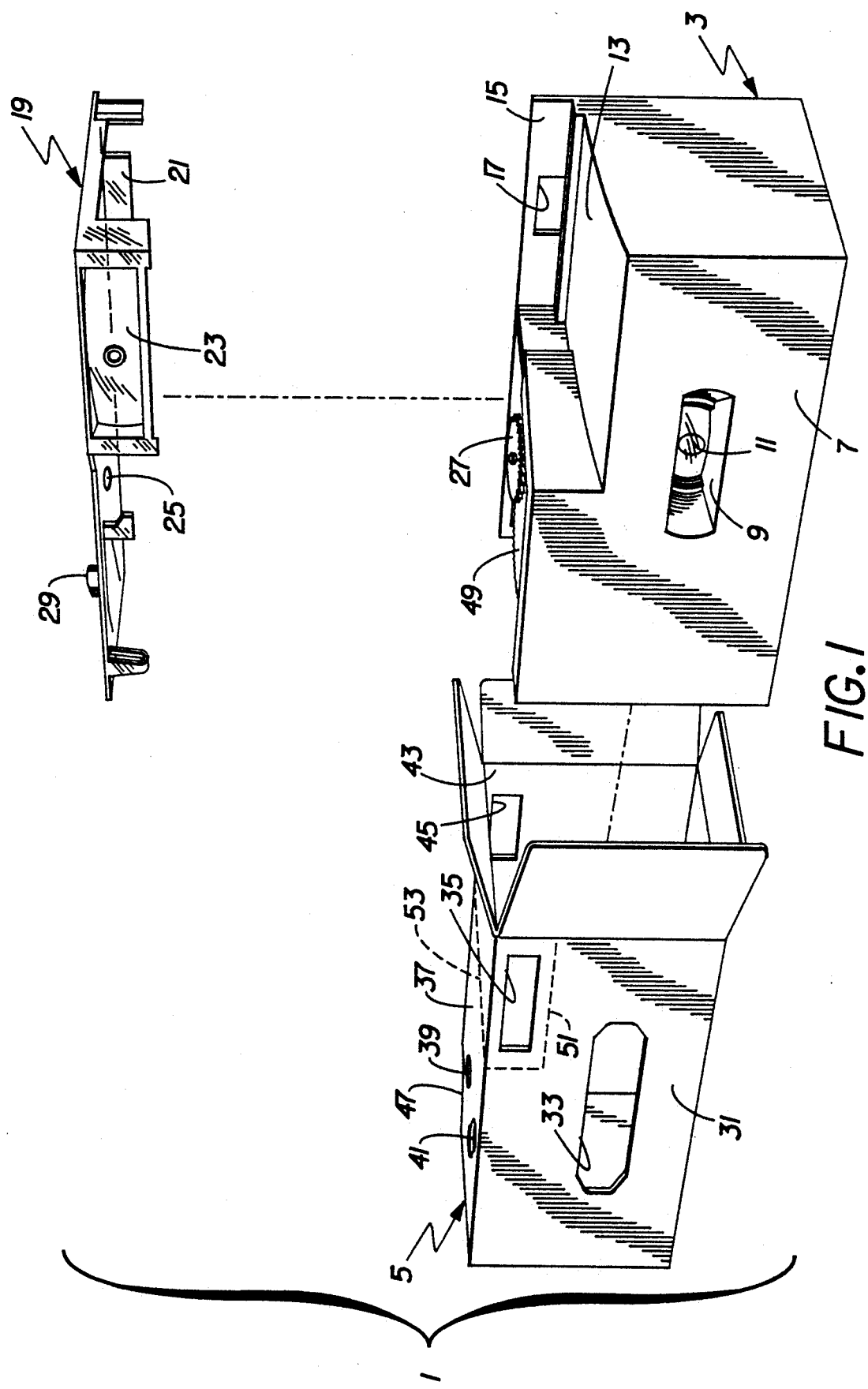
FIG. 1 is an exploded perspective view of a photographic film package including an inner camera pre-loaded with a roll film, a translucent top cover section of the inner camera having integral front and rear finder lenses, and an outer packaging for the inner camera.

Referring now to the drawings, FIG. 1 depicts a photographic film package 1 comprising an inner camera 3 pre-loaded with a conventional 35 mm film cartridge containing a roll film, not shown, and an outer cardboard packaging 5 intended to tightly encase the inner camera.

The inner camera 3 includes a front wall section 7 having a lens opening 9 for a taking lens 11, a viewfinder void 13, a rear wall 15 having a rear finder opening 17, and a non-opaque, i.e. translucent or transparent, top cover 19. See FIG. 1. The top cover 19 has an integral rear finder lens 21 which extends perpendicular to the top cover to hang down into the viewfinder void 13 immediately in front of the rear finder opening 17, an integral front finder lens 23 which extends perpendicular to the top cover to hang down into the viewfinder void in optical alignment with the rear finder lens, an integral top magnifier lens 25 for a built-in frame counter 27, and an integral top shutter release cantilevered push button 29.

Figure 2:
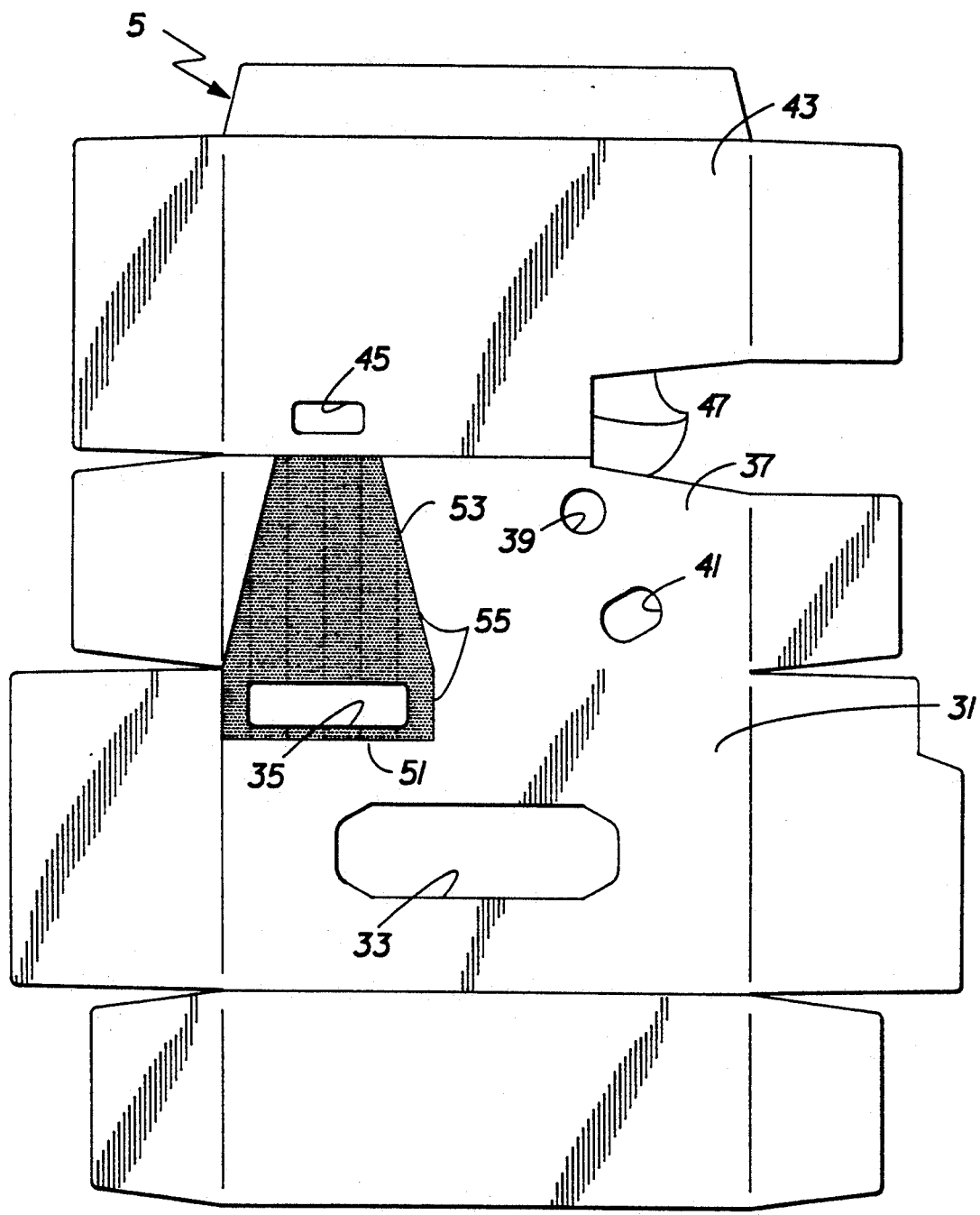
FIG. 2 is a plan view of the outer packaging, laid flat in an unassembled state.

The outer packaging 5 includes a front wall section 31 having a front opening 33 for the lens opening 9 with dimensions that are significantly greater than the lens opening and a front opening 35 for the front finder lens 23 with dimensions that are slightly less than those of the front finder lens to form a peripheral mask for the front finder lens, a top wall section 37 which extends parallel to the top cover 19 and has respective top openings 39 and 41 for the top magnifier lens 25 and the top shutter release button 29, and a rear wall section 43 having a rear opening 45 for the rear finder opening 17 and a rear opening 47 for a built-in manual film advance thumbwheel 49. See FIGS. 1 and 2. An inside surface 51 of the front wall section 31 surrounding the front opening 35 and an inside surface 53 of the top wall section 37 over the viewfinder void 13 is coated with a light-absorbent substance 55, such as dull black ink or paint, to prevent ambient light transmitted through the front finder lens 23 into the viewfinder void from being reflected off the two inside surfaces to the front finder lens and the viewfinder void.

The invention has been described with reference to a preferred embodiment. However, it will be appreciated that variations and modifications can be effected by a person of ordinary skill in the art without departing from the scope of the invention.

I claim:

1. A photographic film package comprising a camera pre-loaded with a roll film and including a non-opaque body section having an integral front finder lens for viewing a subject to be photographed, and an outer opaque packaging tightly encasing said camera and having a front opening for said front finder lens, is characterized in that:

said outer packaging is coated with a light-absorbent substance at a location along its inside surface, which is sufficiently absorbent to prevent ambient light transmitted through said front finder lens to said location from being reflected off said inside surface at least to the front finder lens.

2. A photographic film package as recited in claim 1, wherein said light-absorbent substance is dull black to reflect little or no ambient light.

3. A photographic film package as recited in claim 1, wherein said non-opaque body section has an integral rear finder lens optically aligned with said front finder lens and is translucent except for the front finder lens and said rear finder lens.

4. A photographic film package as recited in claim 1, wherein said location along said inside surface of said outer packaging at which the inside surface is coated with said light-absorbent surface surrounds said front opening for said front finder lens.

5. A photographic film package as recited in claim 1, wherein said non-opaque body section includes a non-opaque top cover for said camera, and said location along said inside surface of said outer packaging at which the inside surface is coated with said light-absorbent surface extends substantially parallel to said top cover to prevent ambient light transmitted through said front finder lens from being reflected off the inside surface to said top cover.

6. A photographic film package as recited in claim 1, wherein said non-opaque body section includes a non-opaque top cover for said camera, said front finder lens is integral with said top cover and is arranged to hang down substantially perpendicular from the top cover, and said location along said inside surface of said outer packaging at which the inside surface is coated with said light-absorbent surface surrounds said front opening for said front finder lens and extends substantially parallel to said top cover.

7. A photographic film package as recited in claim 6, wherein said front opening for said front finder lens has dimensions that are less than those of the front finder lens to form a peripheral mask for the front finder lens.

8. A photographic film package comprising a camera pre-loaded with a roll film and including a non-opaque body section having an integral front finder lens for viewing a subject to be photographed, and an outer opaque packaging tightly encasing said camera and having a front opening for said front finder lens, is characterized in that:

said non-opaque body section includes a translucent top cover for said camera and has a rear finder lens integral with said top cover and arranged to hang down substantially perpendicular from the top cover;

said front finder lens is integral with said top cover and is arranged to hang down substantially perpendicular from the top cover to lie in optical alignment with said rear finder lens; and said outer packaging is coated with a light-absorbent substance at a location along its inside surface, which is sufficiently absorbent to prevent ambient light transmitted through said front finder lens to said location from being reflected off said inside surface at least to the front finder lens.

9. A photographic film package as recited in claim 8, wherein said outer packaging has a rear opening for said rear finder lens, and said location along said inside surface of said outer packaging at which the inside surface is coated with said light-absorbent substance extends rearward from said front opening for said front finder lens towards said rear opening for said rear finder lens.

* * * * *